United States Patent [19]
Dieckmann et al.

[11] Patent Number: 6,154,909
[45] Date of Patent: Dec. 5, 2000

[54] METHOD OF SUPPRESSING THE FORMATION OF SULFURIC ACID AEROSOLE IN EXHAUST GAS PURIFICATION SYSTEMS

[75] Inventors: Hans-Joachim Dieckmann, Herne; Heinz Gutberlet, Raesfeld, both of Germany

[73] Assignee: Preussen Electra Engineering GmbH, Gelsenkirchen, Germany

[21] Appl. No.: 09/374,861

[22] Filed: Aug. 16, 1999

Related U.S. Application Data

[63] Continuation of application No. PCT/EP98/00801, Feb. 13, 1998.

[30] Foreign Application Priority Data

Feb. 15, 1997 [DE] Germany .......................... 197 05 897

[51] Int. Cl.⁷ .......................... B01D 47/06; B01D 47/10
[52] U.S. Cl. .......................... 9/225; 95/235; 261/DIG. 54
[58] Field of Search .......................... 95/235, 224, 225; 96/323; 261/DIG. 54

[56] References Cited

U.S. PATENT DOCUMENTS

| | | |
|---|---|---|
| 3,613,333 | 10/1971 | Gardenier .................................. 95/225 |
| 3,864,485 | 2/1975 | Horsley et al. ............................ 95/235 |
| 4,040,803 | 8/1977 | Atsukawa et al. ......................... 95/235 |
| 4,110,088 | 8/1978 | Cold et al. ................................. 95/224 |
| 4,340,572 | 7/1982 | Ben-Shmuel et al. ................... 423/242 |
| 4,356,009 | 10/1982 | Calvert ....................................... 95/224 |
| 4,469,493 | 9/1984 | Tuovinen et al. ......................... 95/224 |
| 4,828,768 | 5/1989 | Talmor ....................................... 95/235 |
| 5,427,608 | 6/1995 | Auer et al. ................................. 95/224 |
| 5,660,615 | 8/1997 | Neumann et al. ......................... 95/224 |
| 5,756,058 | 5/1998 | Watanabe et al. ......................... 95/187 |

FOREIGN PATENT DOCUMENTS

| | | |
|---|---|---|
| 202510 | 9/1983 | Germany . |
| 3303475 | 8/1984 | Germany . |
| 4125214 | 2/1993 | Germany . |
| 9421356 | 9/1994 | WIPO . |

*Primary Examiner*—Duane S. Smith
*Attorney, Agent, or Firm*—Baker Botts L.L.P.

[57] ABSTRACT

In a method for suppressing the formation of sulfuric acid aerosols in exhaust gas purification systems, the exhaust gas is presprayed with water so that the temperature does not drop below the dew point of sulfuric acid in the exhaust gas, with this spraying taking place upstream from the gas scrubber, upstream from a prescrubber present in addition to the gas scrubber or upstream from a heat exchanger which is in turn upstream from the scrubber, and the gaseous sulfuric acid is absorbed by the water before the temperature drops below the dew point of the sulfuric acid.

6 Claims, 1 Drawing Sheet ions of gaseous sulfuric acid in exhaust gas
METHOD OF SUPPRESSING THE FORMATION OF SULFURIC ACID AEROSOLE IN EXHAUST GAS PURIFICATION SYSTEMS This application is a continuation of PCT/EP98/00801 filed Feb. 13, 1998.

BACKGROUND OF THE INVENTION

This invention relates to a method for suppressing the formation of sulfuric acid aerosols in exhaust gas purification systems. The exhaust gas is presprayed with water such that the temperature does not drop below the dew point of sulfuric acid in the exhaust gas. In this manner, gaseous sulfuric acid is absorbed by the water thereby preventing the formation of sulfuric acid aerosols which can lead to corrosion and emission problems.

To separate sulfur dioxide and sulfur trioxide from exhaust gases produced in the burning of fossil fuels or incineration of refuse in power plants or incinerator systems, sulfur is removed from the exhaust gas. The emission of these substances is reduced drastically by exhaust gas desulfurization to prevent these substances from becoming environmental pollutants.

The most important exhaust gas desulfurization methods are scrubbing methods using suspensions of limestone or hydrated lime. With these so-called wet methods, the exhaust gases are treated with an atomized scrubbing suspension while cooling in spray towers, so that more than 95% desulfurization can be achieved.

In addition to sulfur dioxide, combustion exhaust gases also contain sulfur in the form of gaseous sulfuric acid, which is in gas form when exhaust gas temperatures are above the dew point of sulfuric acid (approx. 130° C.).

Sulfuric acid aerosols are formed by rapid cooling of exhaust gas in gas scrubbers to temperatures of 45° C. to 65° C. Sulfuric acid aerosols are extremely fine droplets of highly concentrated sulfuric acid which are not separated in the scrubber or in downstream mist collectors. Thus, the downstream stages of an exhaust gas purification system are being supplied with liquid sulfuric acid which can be removed completely only at great expense.

Sulfuric acid aerosols lead to emission and corrosion problems. Corrosion problems occur, first, due to acid attacking ducts and equipment in the clean gas pathways downstream from the flue gas scrubbers and upstream from the chimney. Second, problems have occurred in the vicinity of coal-burning power plants in the past due to emission of acid particles.

It is essentially known from German Patent DE 4,125,214 A1 that gas mixtures can be subjected to prespraying with water (quenching) before gas scrubbing in a scrubbing tower. In the known methods, however, the aforementioned rapid drop in temperature is associated with the development of a sulfuric acid aerosol.

SUMMARY OF THE INVENTION

The object of this invention is thus to reduce or prevent the development of a sulfuric acid aerosol in exhaust gas purification systems in power plants and incinerator systems as much as possible.

This object is achieved by a method of suppressing the development of sulfuric acid aerosols in exhaust gas purification systems where the exhaust gas in the exhaust gas purification system of a power plant or an incinerator system is subjected to prespraying with water so that the combustion exhaust gas is cooled to a temperature above the dew point of sulfuric acid. Cooling must thus take place in such a way that the temperature of the combustion exhaust gas does not drop below the dew point of sulfuric acid.

DETAILED DESCRIPTION OF THE PREFERRED EMBODIMENTS

Figure 1:
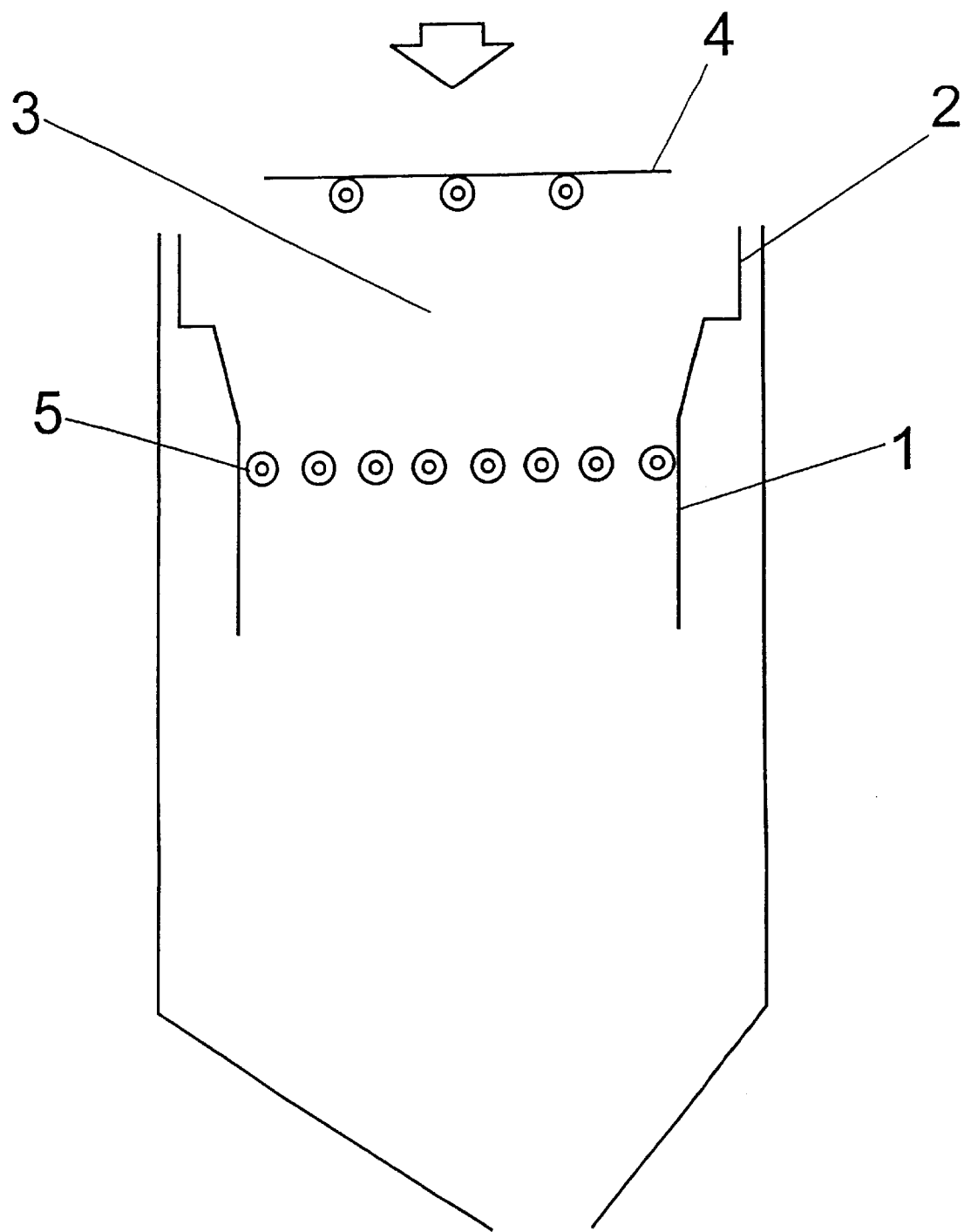
FIG. 1 is a schematic diagram of a purification system including nozzles for prespraying exhaust gas in accordance with the invention.

When using sulfurous fuels, the concentration of gaseous sulfuric acid in the exhaust gas is u to 50 mg/m3. According to a preferred embodiment of the invention, the exhaust gas is cooled to 110° C. to 150° C. by prespraying; according to an especially preferred embodiment, it is cooled to 120° C. to 140° C.

The prespraying with water takes place after the exhaust gas leaves the dust separators and before it enters a gas scrubber. For example, the exhaust gas may enter the scrubber at a temperature higher than 150° C. The temperature of the exhaust gas may vary from power plant or incinerator system to another and may be up to 500° C. or even higher.

With the method according to this invention, cooling is not spontaneous over a large temperature gradient to a scrubbing liquid temperature of 45° C. to 65° C., for example, as is the case in known systems. Instead, prespraying results in establishment of a smaller temperature gradient for cooling of the exhaust gas, thus resulting in preabsorption of sulfuric acid while still gaseous by water. The gaseous sulfuric acid is thus mostly absorbed by water before the temperature drop below the dew point of sulfuric acid.

According to a preferred embodiment of the method according to this invention, after the exhaust gas leaves the electrostatic filters and before it enters the scrubber (absorber), it is sent into a prescrubber (condenser) and presprayed with water through nozzles arranged directly before the entrance of the exhaust gas tube into the prescrubber. According to another preferred embodiment of the invention, prespraying of the exhaust gas takes place before the entrance into a heat exchanger connected upstream from the scrubber.

Thus, absorption of sulfuric acid takes place as long as it is gaseous, thus significantly reducing or even preventing the development of droplets of sulfuric acid (aerosol) in the scrubber or prescrubber. There is no increased use of process water due to the prespraying according to this invention.

The amount of water sprayed in prespraying may be dimensioned so that when a portion of the water is evaporated, the exhaust gas (flue gas) is cooled only to near or just above the dew point of sulfuric acid. The amount of water sprayed into the gas may be 0.01 to 0.02 $l/m^3$, for example. The amount of water used for prespraying according to this invention is thus lower by a factor of 1000 than the amount of water brought in contact with exhaust gas in prescrubbers in the known methods.

To guarantee a high efficiency, water is sprayed against the direction of flow of the exhaust gas, preferably at several locations. To guarantee a high efficiency in separation of gaseous sulfuric acid, sufficient droplets are generated to cover the entire cross section of the flue gas duct and thus prevent a flue gas bypass. The droplet density can be controlled in particular through the number and arrangement of nozzles and through the nozzle pressure. It is self-evident that the number and optionally the arrangement of nozzles depend on the diameter and shape of the device carrying the exhaust gas. For prespraying or quenching, process water from the power plant or incinerator system can be used for spraying.

The droplet spectrum is selected, first, so that the sprayed liquid presents a large enough surface area for absorption of gaseous sulfuric acid, and second, the droplet size is set so that the droplets are not too fine because otherwise the entire volume of water would evaporate.

Whether optimum prespraying conditions have been set can be ascertained by determining the sulfuric acid in the socalled clean gas pathways.

FIG. 1 shows a greatly simplified diagram of a Venturi scrubber 1. Nozzles 4 through which exhaust gas is sprayed with water to absorb gaseous sulfuric acid (gas prespraying) are arranged in the exhaust gas-carrying line 2, i.e., upstream from the gas inlet orifice 3 of the scrubber. The main spraying with an aqueous suspension of hydrated lime to precipitate the sulfur as calcium sulfate dihydrate takes place through the nozzles 5 arranged in the scrubber.

For detecting the efficacy of the method according to this invention, tests of gaseous and aerosol sulfuric acid have been performed in the flue gas upstream and downstream of the flue gas desulfurizing path, with and without the use of prespraying in the prescrubber. To achieve an adequate sulfuric acid content in the raw gas upstream from flue gas desulfurization to ensure the measurement results, the addition of lime to the coal in the boiler plants was set in the test periods, so that as a result of the increasing $SO_2$ boiler conversion rates, an increase in gaseous $SO_3$ concentration from 1–2 mg/m$^3$ to 12–15 mg/m$^3$ $SO_3$ (STP, dry, 5% $O_2$) has been achieved in the raw gas upstream from the flue gas desulfurization plant.

To measure the sulfuric acid content, a sample of exhaust gas is taken downstream from the droplet separators through a suction connection heated to the temperature of the exhaust gas, any sulfuric acid that may be contained in it is separated on a film, and after absorbing the separated sulfuric acid in water, a titrimetric determination of the sulfuric acid is performed.

The results are shown in Diagrams 1 and 2, where in the case of the results in Diagram 1, prespraying of the flue gas according to this invention is performed, but no prespraying was performed in the case of the results presented in Diagram 2.

Diagram 1. $SO_3$ [sic; $SO_3$] Concentration Upstream and Downstream from Flue Gas Desulfurizing Installations in Prespraying of the Flue Gas

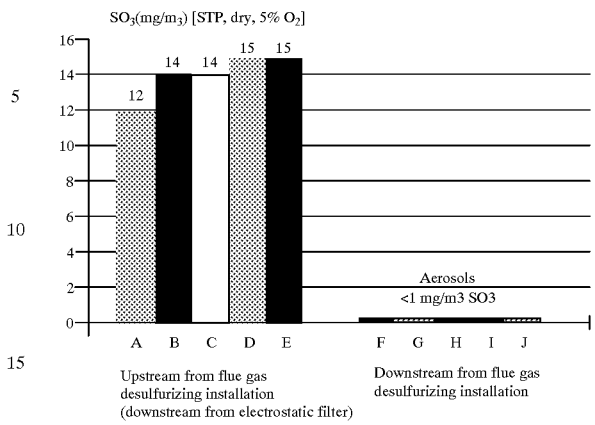

The letters A through J on the abscissa indicate one-hour intervals with a half-hour interruption during which the test was performed.

During the testing period, the concentrations of gaseous sulfur trioxide in the raw gas downstream from the electrostatic filter and upstream from the flue gas desulfurizing installation (flue gas temperature 134–136° C.) were found to be 12–15 mg/m$^3$ (STP, dry, 5% $O_2$). At the same time, sulfuric acid in aerosol form was detected in levels below the limit of detection of 1 mg/m$^3$ $SO_3$ in the clean gas downstream from the flue gas desulfurizing installation (temperatures between 72° C. and 75° C.). In addition, to verify the measured values, gaseous $SO_2$ was determined in the area of a second heat exchanger downstream from the flue gas desulfurizing installation at flue gas temperatures of 138–142° C. Only $SO_3$ concentration of <1 mg/m$^3$ (STP, dry, 5% $SO_2$) were measured due to the prespraying with water according to this invention.

Diagram 2. $SO_3$ Concentrations Upstream and Downstream from Flue Gas Desulfurizing Installations without Prespraying the Flue Gas

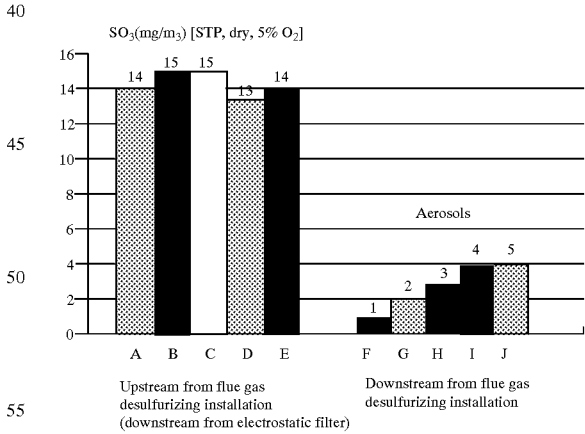

The same explanation applies to the letters A through J as in Diagram 1.

In the test period, gaseous $SO_3$ was detected in the raw gas in a concentration of 13–15 mg/m$^3$ (STP, dry, 5% $O_2$) downstream from the electrostatic filter and upstream of the flue gas desulfurizing installation. At the same time, sulfuric acid in aerosol form was present in a concentration of 3–4 mg/m$^3$ $SO_3$ (STP, dry, 5% $O_2$) in the flue gas downstream from the flue gas desulfurizing plant, after the first heat exchanger and before the second heat exchanger. To verify the measurement results, concentrations of gaseous sulfur trioxide were also measured at the same time in the area of a second heat exchanger downstream from the flue gas desulfurizing installation. Under steady-state boundary conditions of operation, gaseous sulfur trioxide concentrations of 3–5 mg/m$^3$ (STP, dry, 5% $O_2$) were detected, correlating with the values from the aerosol measurements. The measurement results show that 30% to 40% of the gaseous sulfur fed into the flue gas desulfurizing scrubber is converted to sulfuric acid aerosol if there is no prespraying of the flue gas.

These experimental findings show clearly that prespraying of the flue gases in the prescrubber significantly minimizes the production of sulfuric acid aerosol. It has been found that the material condition of the heat exchangers was improved significantly with regard to acid corrosion after starting to prespray the flue gas. The massive corrosion processes on the heat exchangers observed after starting operation of the flue gas desulfurizing installation were directly related to the $H2SO_4$ aerosol burdens in the clean gas streams downstream from the flue gas desulfurizing scrubbers.

What is claimed is:

1. A method of suppressing the formation of sulfuric acid aerosols in exhaust gas purification systems of power plants and incinerator systems comprising introducing an exhaust gas including gaseous sulfuric acid into an exhaust gas purification system, and prespraying the exhaust gas in the exhaust gas purification system with water such that the temperature does not drop below the dew point of the sulfuric acid in the exhaust gas.

2. A method according to claim 1 wherein the purification system comprises nozzles arranged upstream from a scrubber and comprising prespraying the exhaust gas with water from the nozzle.

3. A method according to claim 1 wherein the purification system comprises a prescrubber and comprising prespraying the exhaust gas with water before conveying the exhaust gas into the prescrubber.

4. A method according to claim 1 wherein the purification system comprises an upstream heat exchanger and comprising prespraying the exhaust gas before conveying the exhaust gas into the upstream heat exchanger.

5. A method according to claim 1 wherein the temperature of the exhaust gas drops to 110° C. to 150° C. during prespraying.

6. A method according to claim 1 wherein the temperature of the exhaust gas drops to 120° C. to 140° C. during prespraying.

* * * * *

UNITED STATES PATENT AND TRADEMARK OFFICE
CERTIFICATE OF CORRECTION

PATENT NO. : 6,154,909
DATED : December 5, 2000
INVENTOR(S) : Dieckmann et al.

Page 1 of 1

It is certified that error appears in the above-identified patent and that said Letters Patent is hereby corrected as shown below:

Title page,
Item [54] Title: "AEROSOLE" should read -- AEROSOLS --

Column 1,
Line 3, "AEROSOLE" should read -- AEROSOLS --

Column 2,
Line 16, "50 mg/m3" should read -- 50 mg/m$^3$ --

Column 3,
Line 20, "socalled" should read -- so-called --
Line 65, "[sic; SO$_3$]" should be deleted Column 4,
Diagram 1: "<1 mg/m3 SO3" should read -- <1 mg/m$^3$ SO$_3$ --.

Column 5,
Line 19, "H2SO$_4$" should read -- H$_2$SO$_4$ --

Signed and Sealed this

Twenty-second Day of January, 2002

Attest:

JAMES E. ROGAN
Attesting Officer    Director of the United States Patent and Trademark Office